United States Patent Office 3,520,902
Patented July 21, 1970

3,520,902
3 AND/OR 5 ALKYL MONO AND BIS-PYRROLIDONES WHEREIN AT LEAST ONE ALKYL GROUP IS OF AT LEAST 10 CARBON ATOMS
Donald J. Anderson, San Anselmo, Calif., assignor to Chevron Research Company, San Francisco, Calif., a corporation of Delaware
No Drawing. Original application Nov. 16, 1964, Ser. No. 411,555, now Patent No. 3,301,784, dated Jan. 31, 1967. Divided and this application Sept. 30, 1966, Ser. No. 598,134
Int. Cl. C07d 27/08
U.S. Cl. 260—326.3          5 Claims

ABSTRACT OF THE DISCLOSURE

Alkyl substituted N-hydrocarbon substituted pyrrolidinones are prepared by the reaction of the N-hydrocarbon substituted pyrrolidinones with an olefin in the presence of a free radical catalyst. The resulting products find use as detergents and dispersants in lubricating oils.

CROSS-REFERENCES TO RELATED APPLICATION

This application is a divisional of application Serial No. 411,555, issued as U.S. Pat. No. 3,301,784, Jan. 31, 1967.

This invention concerns novel alkyl pyrrolidinones, their method of preparation, and their use as additives in oil.

Present-day internal combustion engines operate at high speeds and high compression ratios. When used in so-called city stop-and-go driving—the major type of driving conditions for a large percentage of today's automobiles—the internal combustion engines do not reach the most efficient operating temperatures. Under city driving conditions, large amounts of partial oxidation products are formed and reach the crankcase of the engine by blowing past the piston rings. Most of these partial oxidation products are oil insoluble, tending to form deposits on the various operating parts of the engine, such as pistons, piston rings, etc. For the purpose of preventing the deposition of these products on the various engine parts, it is necessary to incorporate detergents in the lubricating oil compositions, thus keeping these polymeric products highly dispersed in a condition unfavorable for deposition on metals.

Under the harsh conditions of the engine—oxidative, acidic, trace metal catalysis—detergents undergo decomposition. It is therefore desirable to have detergents which are able to retain their detersive capability—maintaining the polymeric materials in suspension—for long periods of time. Also, detergents which are themselves stable will not serve as precursors to deposits on the various parts of the engine.

Pursuant to this invention are provided mono- and bis-(N-hydrocarbon (alkyl-substituted)-2-pyrrolidinones) of from 20 to 100 carbon atoms per pyrrolidinone, having from 1 to 4 alkyl substituents in the 3- and 5-positions, which provide good detergency as additives in lubricating oils. The alkyl-substituted pyrrolidinones are readily obtained by telomerizing N-hydrocarbon pyrrolidinones with α-olefins of at least 10 carbons.

The pyrrolidinones of the invention have the following formula:

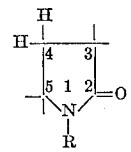

wherein R is a hydrocarbon group of from 1 to 10 carbon atoms, (hydrocarbon is a monovalent organic radical composed solely of carbon and hydrogen, which may be aliphatic, alicyclic, aromatic, or combinations thereof, e.g. aralkyl), the valences of the 3- and 5-positions (symbolized by the extended lines) are satisfied by at least 1 alkyl group (1–4 alkyl groups) of at least 10 carbon atoms, any remaining valences being satisfied by hydrogen. However, one of the valences may be bonded to a second N-hydrocarbon pyrrolidinone of the above formula. That is, if the number of alkyl substituents is $n$ ($n$ being an integer in the range of from 1 to 4) and $m$ symbolizes the presence of the valence bond joining the two pyrrolidinones ($m$ being a cardinal number of from 0 to 1), then the number of hydrogens per pyrrolidinone is mono-pyrrolidinone, the number of hydrogens would be $4-n$, while for the bis-pyrrolidinone, the number of hydrogens per pyrrolidinone is $3-n$.

The mono-pyrrolidinones of this invention have the following formula:

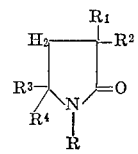

wherein R is a hydrocarbon group of from 1 to 10 carbon atoms, preferably free from aliphatic unsaturation; at least one and generally from 1 to 2 of $R^1$ $R^2$, $R^3$, and $R^4$ (hereafter referred to as $R^{1-4}$) are alkyl of from 10 to 60 carbon atoms, the total number of carbon atoms of $R^{1-4}$ being in the range of from 10 to 80, the others of $R^{1-4}$ being hydrogen.

A preferred group of pyrrolidinones has the following formulae:

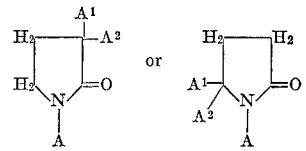

wherein A is lower alkyl, i.e. alkyl of from 1 to 6 carbon atoms, $A^1$ and $A^2$ are hydrogen or alkyl of from 10 to 60 carbon atoms, preferably of from 15 to 45 carbon atoms, at least one (1–2) of $A^1$ and $A^2$ being alkyl (the number of hydrogens is, therefore, 0–1), the total number of carbon atoms in the molecule being in the range of from about 25 to 80.

The bis(N-hydrocarbon pyrrolidinone) has the following formula:

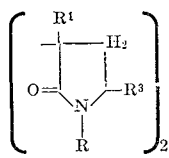

wherein R, R¹, and R³ are as defined previously, (hydrogen or hydrocarbon, at least one hydrocarbon), one of the free valences is the bond between the two pyrrolidinone rings and the other free valence is either hydrogen or an alkyl group, i.e. as R¹ is defined.

Illustrative of various pyrrolidinones which find use in this invention are the following:

N-ethyl 3-(eicosyl)pyrrolidinone-2
N-ethyl 3,3-di(hexadecyl)pyrrolidinone-2
N-tert.-butyl 3,5-di(octadecyl)pyrrolidinone-2
N-decyl 3-(triacontyl)pyrrolidinone-2
N-methyl 5-(triacontyl)pyrrolidinone-2
N-ethyl 3-(tetracontyl)pyrrolidinone-2
N-ethyl 3,3-di(docosyl)pyrrolidinone-2
N-propyl 3,3-di(tetracosyl)pyrrolidinone-2
N-hexyl 3-(octadecyl)pyrrolidinone-2
N-methyl 3,3-di(dodecyl)pyrrolidinone-2, etc.

In preparing the novel N-hydrocarbon alkyl-substituted pyrrolidinones of this invention, the N-hydrocarbon 2-pyrrolidinone is contacted with an α-olefin of at least 10 carbons in the presence of a free radical catalyst at elevated temperatures. The reaction may be carried out near or in the presence of a solvent. Generally, the N-hydrocarbon 2-pyrrolidinone is used in excess and may serve as the solvent. Depending on the particular reactants, at room temperature the α-olefin may not be soluble in the pyrrolidinone. However, at elevated temperature, the solubility of the α-olefin in the pyrrolidinone is usually sufficient to permit reaction to occur at a convenient rate.

In carrying out the reaction, the free radical catalyst, generally peroxidic (hydrocarbon hydroperoxide, bis(hydrocarbon)peroxide, bis(acyl)peroxide, etc.) may be added initially or added as aliquots throughout the course of the reaction. The latter procedure is preferred, since it permits a relatively constant concentration of radicals in the system. Various organic radical sources may be used which are soluble in the reaction mixture and decompose at a convenient rate. Usually, the choice of free radical catalyst will determine the temperature of the reaction. Illustrative of various catalysts are the azonitrile catalysts, e.g. azo-bis-isobutyronitrile; hydroperoxide catalysts, e.g. t-butylhydroperoxide, cumylhydroperoxide, decalylhydroperoxide, etc.; and the peroxy catalysts, e.g. di-tert.-butylperoxide, dicumylperoxide, dilauroylperoxide, ascaridole, benzoylperoxide, etc.

The mole ratio of pyrrolidinone to olefin will generally be at least 1:1, and more usually 1–10:1. Preferably, the mole ratio of pyrrolidinone to olefin will be in the range of 3–7:1. The mole ratio of peroxide to olefin will generally be in the range of about 0.005–0.1:1, more usually in the range of about 0.005–0.5:1.

The temperature for the reaction, as already indicated, will depend on the particular free radical catalyst. Generally, the temperature will be in the range from about 50° C. to 200° C., more usually in the range from about 90° C. to 150° C. The time for the reaction is not really meaningful. The time will depend on the amount of materials used, the temperature, the catalysts used, and the amount of product desired. In most instances the reaction will be carried out for at least one-half hour, and may be carried out for a number of days.

The number of olefins added per pyrrolidinone reacted will generally range from about 1 to 4, more usually from 1 to 3, and will most usually average out to about 2.

The olefins used will generally be in the range of 10 to 26 carbon atoms.

The resulting product from the process will generally be a mixture of compounds with one or two compounds predominating. Various separation techniques may be used to concentrate or isolate a particular compound.

Illustrative of olefins which may be used in the preparation of compounds of this invention are 1-decene, 1-dodecene, 1-tetradecene, 1-hexadecene, 1-octadecene, 1-eicosene, 1-docosene, 1-tetracosene, etc.

However, the method for preparing the compounds of this invention is novel and need not be limited to olefins of at least 10 carbon atoms. By using high pressure to maintain the α-olefin in the liquid phase, α-olefins of from 2 carbons may be used, generally in the range of 2 to 30 carbon atoms.

Illustrative of N-hydrocarbon pyrrolidinones which may be used are N-methyl pyrrolidinone-2, N-ethyl pyrrolidinone-2, N-tert.-butyl pyrrolidinone-2, N-phenyl pyrrolidinone-2, N-cyclohexyl pyrrolidinone-2, N-decyl pyrrolidinone-2, N-octyl pyrrolidinone-2, etc.

The bis-pyrrolidinone is prepared by combining the pyrrolidinone with from 0.5 to 2, more usually 0.5 to 1 mole per mole of pyrrolidinone of a free radical forming organic compound and heating the mixture to a temperature in the range of 80° to 200° C. The temperature will depend on the catalyst. Illustrative of catalysts are the peroxidic catalysts previously described.

The following examples are offered by way of illustration and not by way of limitation.

EXAMPLE I

Into a reaction flask was introduced 396 g. (4.0 moles) of N-methyl 2-pyrrolidinone, 193 g. (0.8 mole) of a mixture of olefins of $C_{15}$–$C_{20}$ (average molecular weight 241) and heated to 90° C. in nitrogen atmosphere. To this mixture was added 2.42 g. (0.01 mole) of benzoyl peroxide and the heating continued for 5 hours. At the end of this time the temperature was raised to 140° C. and 7.3 g. (0.05 mole) of di-tert.-butylperoxide was added in 1 ml. aliquots every 2 hours. After the last addition, the temperature was maintained for an additional 4 hours. The product was then cooled and the upper layer which appeared on cooling removed. The lower layer was dissolved in ether, washed with water, and then stripped in vacuo to remove any residual α-olefins. The residue weighed 91.8 g. Analysis: Percent N, 2.07, 2.10; mol. wt. (ThermoNAM) (differential vapor pressure technique) =670, 672.

EXAMPLE II

Into a reaction flask was introduced N-methyl pyrrolidinone-2 (496 g., 5 moles) and 241 g. (1.0 mole) of α-olefins of 15 to 20 carbons (average molecular weight 241) and the mixture heated to 140° C. with stirring. To this mixture was added 7.3 g. (0.05 mole) of di-tert.-butylperoxide at a rate of 1 ml. aliquot every 4 hours. At the end of this time the mixture was cooled and separated into two phases. The upper phase was removed, diluted with 250 ml. of ether, washed 8 times with 250 ml. of water, dried, and then stripped of solvent yielding 200 g. of a white solid. Analysis: Percent N, 1.78, 1.75; mol. wt. (ThermoNAM)=544.

The remaining lower phase was distilled in vacuo to 1 mm. Hg, the head temperature not exceeding 90° C. The white solid residue weighed 87 g. Analysis: Percent N, 3.25, 3.29; mol. wt. (ThermoNAM)=374.

The product from the upper phase was distilled at 0.5 mm. Hg with a pot temperature of 210° C. The residue weighed 161 g. Analysis: Percent N, 1.80, 1.87; mol. wt. (ThermoNAM)=621.

EXAMPLE III

Into a reaction flask was introduced 2475 g. (25 moles) of N-methyl 2-pyrrolidinone and 1205 g. (5.0 moles) of olefins of $C_{15}$–$C_{20}$ (average molecular weight 241) and the mixture heated to 140° C. To this mixture was added at the rate of 1 ml. every hour for a period of 18 hours, di-tert.-butylperoxide, continuing the addition for a further period of 48 hours at the rate of 1 ml. every 4 hours. The reaction mixture was cooled, separating into 2 layers. The upper layer was removed, distilled at 0.6 mm. Hg, reaching a head temperature of 135° C. The residue weighed 814 g. and was filtered hot to Celite. Analysis: Percent N, 1.81, 1.84; mol. wt. (ThermoNAM)=662.

The lower layer was distilled at 0.3 mm. Hg, the head temperature reaching 140° C., being a residue of 287 g. Analysis: Percent N, 3.22, 3.14; mol. wt. (ThermoNAM)=358.

EXAMPLE IV (A) Into a reaction flask was introduced 2475 g. (25 moles) of freshly distilled N-methyl 2-pyrrolidinone, and 602.5 g. (2.5 moles) of $C_{15}$–$C_{20}$ olefins (average molecular weight 241), the mixture heated and stirred to 140° C., and 1 ml. aliquot of di-tert.-butylperoxide added hourly until a total of 18.25 g. of the peroxide was added, 23 hours. The mixture was heated for a further 4 hours and then cooled, two layers forming.

(B) The procedure indicated above was followed, except that the pyrrolidinone had not been freshly distilled.

At the end of the two reactions, the products were combined and the volatile material distilled off. The residue weighed 1246 g. Analysis: Percent N, 2.75, 2.76; mol. wt. (ThermoNAM)=473.

EXAMPLE V

Into a reaction flask was introduced 2475 g. (25 moles) of N-methyl 2-pyrrolidinone and 1205 g. (5 moles) of $C_{15}$–$C_{20}$ olefins (average molecular weight 241), the mixture heated to 145° C. with stirring, and di-tert.-butylperoxide (14.6 g., 0.1 mole) added at a rate of 1 ml. per 2 hours. After completion of the addition of the catalyst, heating was continued for a further 4 hours. The mixture was cooled to room temperature, separating into two layers. The upper layer was dissolved in hexane, washed with water repeatedly, dried, and stripped at 0.3 mm. Hg, pot temperature of 150° C. The residue weighed 958 g. Analysis: Percent N, 1.87, 1.89; mol. wt. (ThermoNAM)=635.

EXAMPLE VI

Following the procedure of Example V, 944 g. of C-alkyl-substituted N-methyl pyrrolidinone-2 was prepared; percent N=2.08, 2.11; mol. wt. (ThermoNAM)=625. A 625 g. (1.0 mole) aliquot of the above product was mixed with 146 g. (1.0 mole) of di-tert.-butylperoxide and heated at 130° C. for 18 hours and then the temperature raised slowly to 180° C. while lowering the pressure to 1 mm. Hg. The residue weighed 615 g. Analysis: Percent N=2.18, 2.16; mol. wt. (ThermoNAM)=1054.

Example VII

The procedure of Example V was repeated, except that the lower layer was retained when the reaction mixture separated into two layers. The lower layer was stripped to remove volatile material, yielding 1000 g. of product. Analysis: Percent N=3.33, 3.35; mol. wt. (ThermoNAM)=385, 390.

The above product (975 g., 2.5 moles) was mixed with 183 g. (1.25 mole) of di-tert.-butylperoxide and heated at 130° C. for 18 hours, and then the temperature raised to 185° C. and the pressure lowered to 0.5 mm. Hg, maintaining these conditions for 1 hour. The final product was a waxy solid. Analysis: Percent=3.33, 3.32

In order to demonstrate the effectiveness of the pyrrolidinones of this invention as detergents in lubricating oils, a number of the compounds of this invention were tested under the severe conditions of the 1–G Supercharged Caterpillar Test (MIL–L–45199). Using a Mid-Continent SAE 30 base oil containing 12 mM./kg. of zinc O,O - di(alkylphenyl)phosphorodithioate (alkyl is polypropylene of 12 and 15 carbon atoms) and the indicated percent of the candidate detergent, the test was carried out for 60 hours. The following results were obtained:

TABLE I

| Example | Wt. percent Detergent | Groove Deposits | Piston land Deposits | Underhead |
|---|---|---|---|---|
| Combine II and III | 10 | 44–11–1. 0–0. 5 | 550–100–40 | Light brown. |
| V | 5 | 41–16–0. 5–0 | 655–130–50 | Do. |
|  | 10 | 52–13–2. 7–0. 5 | 765–300–125 | Light-dark brown. |
| VI | 5 | 51–9–2–0. 2 | 505–130–45 | Light brown. |
| VII | 7.5 | 62–7–0. 4–0 | 575–35–30 |  |
| Base Oil + 12 mm./kg. zinc salt |  | 93–15–5–3 | 500–800–370 |  |

It was further found by observation that the underheads were colored a light brown, indicating that the candidate detergents had excellent thermal and chemical stability under the engine conditions. Thus, the readily accessible compounds disclosed in this invention find good use as detergents without contributing to the formation of gums and tars.

The compounds of this invention can be used with various base oils used as lubricating oils, such as naphthenic base, paraffin base, and mixed-base lubricating oils. Synthetic oils, such as olefin polymers, alkylene oxide polymers, etc. Dicarboxylic acid esters, formed by esterifying such acids as adipic acid, azelaic acid, sebacic acid, alkenyl succinic acid, with alcohols, such as butyl alcohol, hexyl alcohol, 2-ethylhexyl alcohol, dodecyl alcohol, etc. Various aromatic hydrocarbons, and substituted aromatic hydrocarbons. Organic silicon compounds.

The above base oils may be used individually or in combination thereof, whenever miscible or made so by the use of mutual solvents.

The pyrrolidinones of this invention can be used in oils of lubricating viscosity in amounts of from 0.1 to 80 weight percent. When the oil is to be used in an engine, usually the amount will be 0.1 to 10 weight percent, more usually 0.25 to 5 weight percent. However, because of the excellent compatibility of the compounds of this invention with the various lubricating oils, the oil compositions may be prepared as concentrates having the pyrrolidinones in from 10 to 80 weight percent.

Preferably, compounds of this invention are used with zinc dihydrocarbyl phosphorodithioates, wherein the hydrocarbyl group is of from 4 to 36 carbon atoms. (By hydrocarbyl is intended a monovalent organic radical composed solely of carbon and hydrogen, which may be aliphatic, alicyclic, or aromatic, as well as combinations thereof, e.g. aralkyl.) Usually, about 6–50 mM./kg. are used in the engine oil.

As will be evident to those skilled in the art, various modifications on this process can be made or followed, in the light of the foregoing disclosure and discussion, without departing from the spirit or scope of the disclosure or from the scope of the following claims.

I claim:

1. A method for preparing N-hydrocarbon 2-pyrrolidinones having at least one alkyl substituent in at least one of the 3- and 5-positions, which comprises combining an N-hydrocarbon 2-pyrrolidinone with an α-olefin of from 2 to 30 carbon atoms in the liquid phase in the presence of a free radical catalyst at a temperature of at least about 50° C.

2. The product prepared by combining N-hydrocarbon pyrrolidinone, wherein the hydrocarbon group is of from 1 to 10 carbon atoms, with an olefin of from 10 to 60 carbon atoms, wherein the mole ratio of pyrrolidinone to olefin is in the range of 1–10:1, at a temperature in the range of 50° C. to 200° C. in the presence of a free radical catalyst.

3. The product according to claim 2, wherein said free radical catalyst is a peroxide.

4. The product according to claim 3 wherein the mole ratio of peroxide to olefin is in the range of about 0.005–0.1:1.

5. The product prepared by combining the product of claim 2 with a free radical producing organic compound in a mole ratio of 1:0.5–2 and heating the mixture at a temperature in the range of 80° C. to 200° C.

No references cited.

ALEX MAZEL, Primary Examiner

J. TOVAR, Assistant Examiner

U.S. Cl. X.R.

252—51.5; 260—326.5